United States Patent [19]

Pampouchidis et al.

[11] 4,179,425

[45] Dec. 18, 1979

[54] SELF-CROSSLINKING CATIONIC POLYURETHANE BASED ELECTRODEPOSITABLE BINDERS

[75] Inventors: Georgios Pampouchidis; Helmut Hönig, both of Graz, Austria

[73] Assignee: Vianova Kunstharz, A.G., Vienna, Austria

[21] Appl. No.: 874,563

[22] Filed: Feb. 2, 1978

[30] Foreign Application Priority Data

Feb. 7, 1977 [AT] Austria ............................. 757/77

[51] Int. Cl.$^2$ ............................................. C08L 33/08
[52] U.S. Cl. ................... 260/29.6 NR; 260/29.2 TN; 528/49; 528/75
[58] Field of Search ................................. 528/75, 49; 260/29.6 NR, 29.2 TN

[56] References Cited

U.S. PATENT DOCUMENTS 3,939,126   2/1976   Carder et al. ........................ 528/75
3,948,739   4/1976   Chaudhari et al. ................... 528/75

Primary Examiner—Maurice J. Welsh
Attorney, Agent, or Firm—A. W. Breiner

[57] ABSTRACT

Binders for cathodically depositable aqueous coating compositions comprising the reaction product of (A) one mole polyisocyanate with (B) at least one mole dialkylalkanolamine and a monohydroxyalkyl(meth)acrylate and/or monohydroxyalkoxy(meth)acrylate and/or a monohydroxyallylether of a polyol. Optionally, there can be included a saturated and/or unsaturated fatty alcohol or fatty acid. The binders have an NCO-value of substantially zero; a molecular weight of from about 500 to 5000, and in each 1000 molecular weight unit a basic content of from about 0.5 to 3 and a double bond content of from about 0.5 to 4. The binders in coating compositions cure at relatively low temperatures and relatively short curing times to provide films having excellent resistance to water, chemicals, and corrosion.

12 Claims, No Drawings

SELF-CROSSLINKING CATIONIC POLYURETHANE BASED ELECTRODEPOSITABLE BINDERS

The present invention is directed to the preparation of, and to coating compositions which upon neutralization with acids are water dilutable. The compositions are electrically depositable at the cathode of an electrodeposition system and will crosslink through thermal polymerization without additional components.

Electrodeposition of synthetic resins and plastics, although known for substantial time, has gained technical importance as a coating process in only recent years. The coating compositions or binders primarily used for commercial electrodeposition contain polycarboxylic acid resins neutralized with bases. The products deposit at the anode of an electrodeposition system. Owing to the acidic character of the resins, the products are sensitive to corroding influences exerted by salts and particularly by alkalis. Furthermore, coatings of the aforesaid compositions tend to undergo spot discoloration or undergo other chemical change as a result of the metal ions anodically dissolved from the anode. Accordingly, there has been a desire to use coating compositions which will deposit at the cathode of an electrodeposition system.

A substantial number of binders are disclosed in the literature carrying groupings neutralizable with acids which can be deposited on cathodically wired objects of an electrodeposition system. Many have disadvantages primarily due to the need to have crosslinking additives in the coating compositions which adversely affect film characteristics. Recently, however, coating compositions have been provided which are self-crosslinking through thermal polymerization. These self-crosslinking binders include binders comprising:

(A) the reaction products of diepoxy compounds with alpha, beta-unsaturated acids and, optionally, long chain fatty acids, and basic monoisocyanates as described in copending application Ser. No. 816,936 filed July 19, 1977, assigned to the assignee of the present application;

(B) reaction products of diepoxy compounds, which optionally include fatty acids, with monoamines and unsaturated monoisocyanates as described in copending application Ser. No. 816,937 filed July 19, 1977, assigned to the assignee of the present application; and (C) two moles of a diepoxy compound plus one mole of a primary-tertiary or secondary-secondary diamine plus two moles of an alpha,beta-unsaturated monocarboxylic acid and, optionally, an unsaturated fatty acid, plus an unsaturated monoisocyanate as described in copending application Ser. No. 849,265 filed Nov. 7, 1977, assigned to the assignee of the present application. The aforesaid binders are highly desirable due to their ability to self-crosslink through the presence of alpha,-beta-unsaturation; their being water-soluble in the presence of acids due to the basic nitrogen atoms, and their ability to provide excellent films with good performance characteristics, particularly regarding resistance to corroding influences. The aforesaid binders, however, utilize relatively expensive components and, accordingly, cannot be used for many applications because of cost.

OBJECTS OF THE INVENTION AND GENERAL DESCRIPTION

It has now been found that self-crosslinking binders can be prepared from raw materials which are relatively inexpensive and which permit optimum adjustment of the binder materials to correspond to the method and installations used in processing the binders. The relatively low cost of the components permits the use of cathodic electrodeposition on a substantially wider scale than heretofore possible.

The new binders of the present invention include polymerizable and basic polyurethane compounds wherein one mole of an aromatic, cycloaliphatic, or aliphatic polyisocyanate is reacted with at least one mole of a dialkylalkanolamine. The remaining isocyanate groups are reacted stepwise or simultaneously with the corresponding quantity of a monohydroxyalkyl(meth)acrylate and/or monohydroxyalkoxy(meth)acrylate and/or monohydroxyallylether of a polyol, and, optionally, with a saturated and/or an unsaturated monoalcohol with up to 24 carbon atoms and/or a saturated and/or an unsaturated fatty acid with up to 24 carbon atoms. The components and reaction are controlled to provide a product having a molecular weight of from about 500 to 5000, preferably from about 700 to 2000; 0.5 to 3, preferably 0.7 to 2, basic nitrogen atoms in 1000 molecular weight units, and a double bond content of from about 0.5 to 4, preferably from about 0.7 to 3.5. The binders are rendered water-dilutable through partial or total neutralization with inorganic and/or organic acids. "Double bond number" as used herein is the number of chain end or side chain double bonds per 1000 molecular weight units.

The binders of the present invention have the formula—

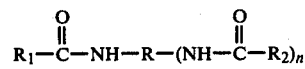

wherein n is an integer of 1, 2, or 3; R is an aromatic, cycloaliphatic, or aliphatic hydrocarbon radical; $R_1$ is the moiety of a dialkylalkanolamine remaining after reaction with an isocyanate group; $R_2$ is the moiety of a monohydroxyalkyl(meth)acrylate and/or a monohydroxyalkoxy(meth)acrylate and/or a monohydroxyallylether of a polyol; and, optionally, in part the moiety of a saturated and/or unsaturated fatty alcohol with up to 24 carbon atoms, and/or a saturated and/or an unsaturated fatty acid with up to 24 carbon atoms. When n is greater than 1, $R_2$ can be a moiety corresponding to $R_1$. As noted hereinbefore, for use as electrodeposition binders, the resins of the above formula should have a molecular weight of from about 500 and 5000 and preferably from about 700 and 2000. In 1000 molecular weight units the content of basic groups, preferably basic nitrogen atoms, is from about 0.5 to 3 and preferably from about 0.7 to 2. The content of polymerizable chain end or side chain double bonds is from about 0.5 to 4 and preferably from about 0.7 to 3.5. The products are prepared by stepwise or simultaneous reaction of one mole of a polyisocyanate with at least one mole of a dialkylalkanolamine and one to 3 moles of a saturated or unsaturated hydroxy or carboxy component, at 20° to 80° C., optionally in the presence of isocyanate inert solvents and isocyanate reactive catalysts.

Suitable polyisocyanates for use in this invention include aromatic isocyanates such as 2,4- or 2,6-toluylenediisocyanate or its dimerization or trimerization products, 4,4'-diphenylmethanediisocyanate, 4,4',4''-triphenylmethanetriisocyanate, trimethylolpropane-tris-toluylene-isocyanate, and tri-(4-isocyanatophenyl)-thiophosphate; or cycloaliphatic isocyanates such as isophoronediisocyanate, cyclohexane-1,4-diisocyanate and dimeryldiisocyanate; and aliphatic isocyanates such as trimethylhexamethylene-1,6-diisocyanate, and tris-hexamethylene-triisocyanate. Suitable dialkylalkanolamines include dimethylethanolamine, diethylethanolamine and their higher homologues or isomers. Suitable polymerizable monohydroxy compounds include hydroxyalkylesters of acrylic acid or methacrylic acid, tri- or tetra-propyleneglycol-mono(meth)acrylate, tri-methylolpropane-di-(meth)acrylate, pentaerythritol-tri-(meth)acrylate, trimethylolpropanediallylether and pentaerythritol-triallylether. Monohydroxy compounds which can be used in part are the saturated or unsaturated alcohols with 1 to 18 carbon atoms. Saturated or unsaturated monocarboxylic acids which can be used in part are those with 2 to 18 carbon atoms. During the reaction of a carboxylic acid and an isocyanate, as is known, carbonic acid is set free. Suitable unsaturated fatty alcohols include 10-undecane-1-ol; 9 c-octadecene-1-ol (oleylalcohol); 9 t-octadecene-1-ol (elaidylalcohol); 9 c, 12 c-octadecadiene-1-ol (linoleylalcohol); 9 c, 12 c, 15 c-octadecatriene-1-ol (linolenylalcohol); 9 c-eicosene-1-ol (gadoleylalcohol); 13 c-docosene-1-ol (erucaalcohol), and 13 t-docosene-1-ol (brassidylalcohol). Furthermore, saturated monoalcohols with at least 6 carbon atoms can be coemployed to enhance leveling. The preferred alcohols are hexanol, nonanol, decanol and their further homologues such as dodecanol (laurylalcohol), octadecanol (stearylalcohol), and the like; and alkylalcohols such as 2-ethylhexanol, 2-pentylnonanol, 2-decyl-tetradecanol and other alcohols known as Guerbet alcohols. The unsaturated fatty acids include oleic acid, linoleic acid, linolenic acid, or other acids contained in the natural oils or in their modified derivatives. The same applies to the saturated monocarboxylic acids. Moreover, as saturated or unsaturated monocarboxylic acids, semiesters of dicarboxylic anhydrides with monoalcohols are also suitable.

The amino groups of the coating compositions of the invention are partially or totally neutralized with organic and/or inorganic acids, e.g., formic acid, acetic acid, lactic acid, phosphoric acid, and the like, and are then diluted with water. The degree of neutralization depends upon the characteristics of the individual binder. The preferred binder composition permits dilution or dispersion with water at a pH-value of from 4 to 9, preferably 6 to 8.

The concentration in water of the binder depends upon the parameters of electrodeposition and may lie in a range of between 3 to 30 percent by weight, preferably of from 5 to 15 percent by weight. The applied coating composition may optionally contain various additives such as pigments, extenders, surface active agents, etc. Upon electrodeposition the binders of the invention as a vehicle of the aqueous coating composition are wired to a conductive anode and cathode, the surface of the cathode being coated with the coating composition. The conductive substrates to be coated may be a variety of materials, particularly of metals such as steel, aluminum, copper, and the like; however, other metalized materials or materials rendered conductive through a conductive coating can be employed. After deposition, the coating is cured at a stoving schedule of from 130° to 200° C., preferably 150° to 180° C. for about 5 to 30 minutes, preferably 10 to 25 minutes.

The following examples illustrate the invention without limiting its scope.

EXAMPLES 1–12

1 mole of the polyisocyanates is charged to the reaction vessel and diluted with an isocyanate inert solvent in order that the final product has a concentration of 60 percent. The isocyanate equivalent quantity of the isocyanate reactive compound is added at 20° to 60° C., while stirring and preventing access of moisture. The addition is within one hour. The charge is reacted further, at 60° to 100° C., until and NCO-value of zero is attained, with optional coemployment of polymerization inhibitors. The following table gives the reactants of Examples 1–12, their mole ratios, and the theoretical molecular weight, the number of basic nitrogen atoms in 1000 molecular weight units (=BNz) and the number of polymerizable double bonds in 1000 molecular weight units (=DBz) of the binder.

TABLE 1

| Ex. | 1 Mole Polyisocyanate | Solvent | Mole Amino-Compound | Mole Hydroxyl-Compound | M. Wgt. | BNz | DBz |
|---|---|---|---|---|---|---|---|
| 1 | IPDI | AEGLAC DMF | DMPA | 0.5 TPGMMA 0.5 PTMA | 670 | 1.49 | 3.00 |
| 2 | DDI | AEGLAC | 1 DMAEA | 0.5 PTMA 0.5 HAEMA | 927 | 1.08 | 2.16 |
| 3 | DDI | AEGLAC | 1 DMAEA | 0.7 PTMA 0.3 OLA | 1007 | 1.0 | 2.04 |
| 4 | DDI | AEGLAC | 1 DMPA | 0.7 PTMA 0.3 TPGMMA | 1046 | 0.96 | 2.3 |
| 5 | TPMT | AEGLAC | 1 DMAEA | 1.0 PTMA 1.0 TPGMMA | 1146 | 0.89 | 3.55 |
| 6 | TPMT | AEGLAC | 1 DMAEA | 1.0 PTMA 1.0 OLA | 1062 | 0.93 | 2.91 |
| 7 | TMPtTI | AEGLAC | 1 DMPA | 1.0 TMPDMA 1.0 HBA | 1173 | 0.85 | 3.4 |
| 8 | TMPtTI | AEGLAC DMF | 1.5 DMAEA | 1.0 PTMA 0.5 TPGMMA | 1314 | 1.14 | 2.66 |
| 9 | TMPtTI | AEGLAC | 1 DMAEA | 1.0 PTAL 1.0 TPGMMA | 1361 | 0.73 | 2.94 |
| 10 | TMPtTI | AEGLAC | 1 DMAEA | 1.5 PTMA 0.5 OLA | 1397 | 0.71 | 3.2 |
| 11 | TIPTP | AEGLAC | 1 DMAEA | 1.0 PTMA | 1160 | 0.86 | 2.6 |

TABLE 1-continued

| Ex. | 1 Mole Polyiso-cyanate | Solvent | Mole Amino-Compound | Mole Hydroxyl-Compound | M. Wgt. | BNz | DBz |
|---|---|---|---|---|---|---|---|
| 12 | TIPTP | DMF AEGLAC DMF | 1 DMAEA | 1.0 OLA 1.0 TMPDMA 1.0 TPGMMA | 1174 | 0.85 | 2.65 |

Key to Table 1
AEGLAC - ethylglycolacetate (monoethyleneglycolmonoethyletheracetate)
DMF - dimethylformamide
TDI - toluylenediisocyanate (available isomer blend)
IPDI - isophoronediisocyanate
TPMT - triphenylmethanetriisocyanate
TMPtTI - trimethylolpropane-tris-toluyleneisocyanate
TIPTP - tris-(4-isocyanatophenyl)-thiophosphate
DDI - dimeryldiisocyanate
DMAEA - dimethylethanolamine
DMPA - dimethylpropanolamine
HAEMA - hydroxyethylmethacrylate
HBA - hydroxybutylacrylate
OLA - oleyl alcohol
TPGMMA - tripropyleneglycolmonomethacrylate
PTMA - pentaerythritoltrimethacrylate
PTAL - pentaerythritoltriallylether

EVALUATION OF THE BINDERS PREPARED IN EXAMPLES 1-12

Of the binders each 100 g resin solids samples were mixed with the quantity of acid listed and made up to 1000 g with deionized water while stirring. The 10 percent solutions were deposited on various substrates which functioned as the cathode of the electrodeposition system. Deposition time in all cases was 60 seconds. The coated substrates were rinsed with deionized water and cured at the listed temperature. Average film thickness of the cured films was between 13 to 17 μm. The evaluation results are listed in Table 2.

TABLE 2

| | Neutralization | | | Deposition | | Hardness | Test for Indentation | Resistance | |
|---|---|---|---|---|---|---|---|---|---|
| | Quantity (1) | Type (2) | pH (3) | Volt | Cure Min/°C. | (4) | (5) | (6) | (7) |
| 1 | 4.0 | E | 5.9 | 160 | 20/170 | 150 | 7.5 | 360 | 240 |
| 2 | 3.5 | E | 6.0 | 180 | 15/170 | 140 | 8.5 | 280 | 140 |
| 3 | 3.5 | E | 6.0 | 180 | 20/180 | 140 | 8.8 | 280 | 120 |
| 4 | 5.5 | M | 5.8 | 170 | 20/180 | 160 | 8.0 | 320 | 160 |
| 5 | 5.2 | M | 6.1 | 180 | 20/180 | 180 | 8.2 | 300 | 120 |
| 6 | 5.0 | M | 6.3 | 180 | 25/180 | 180 | 8.2 | 280 | 120 |
| 7 | 3.5 | E | 5.9 | 200 | 15/180 | 190 | 7.8 | 360 | 260 |
| 8 | 3.2 | E | 6.4 | 220 | 20/180 | 180 | 7.5 | 280 | 200 |
| 9 | 3.0 | E | 6.2 | 220 | 25/180 | 160 | 8.5 | 300 | 160 |
| 10 | 3.2 | E | 6.0 | 230 | 20/180 | 180 | 8.0 | 320 | 180 |
| 11 | 1.6 | P | 5.4 | 200 | 25/180 | 170 | 8.0 | 260 | 120 |
| 12 | 1.6 | P | 5.5 | 190 | 25/180 | 160 | 8.5 | 240 | 120 |

Key to Table 2
(1)quantity of acid in g added to 100 g of resin solids
(2)E = acetic acid, M = lactic acid, P = phosphoric acid
(3)measured on a 10% aqueous solution
(4)Konig pendulum hardness DIN 53 157 (sec)
(5)Erichsen indentation DIN 53 156 (mm)
(6)hours of water soak at 40° C. until corrosion or blistering become visible
(7)salt spray ASTM-B 117-64-2 mm of corrosion at the cross incision after the stated hours For the test of Table 2 degreased non-pretreated steel panels were coated with a pigmented paint consisting of 100 parts by weight of resin solids, 20 parts by weight of aluminum silicate pigment, and 2 parts by weight of carbon black.

In the above illustrative examples various modifications can be made falling within the scope of the claimed invention. Such modifications being within the ability of one skilled in the art are within the scope of the present invention.

It is claimed:

1. Thermosetting binders which are water-dilutable and suitable for cathodically depositable coatings comprising the reaction product of (A) 1 mole polyisocyanate, (B) at least 1 mole dialkylalkanolamine and (C) at least one member of the group consisting of monohydroxyalkyl(meth)acrylate, monohydroxyalkoxy(meth)acrylate, and monohydroxyallylether of a polyol, said reaction product having an NCO-value of substantially zero, a molecular weight of from about 500 to about 5000, a basic content of about 0.5 to 3 for each 1000 molecular weight unit of binder, and a double bond content of from about 0.5 to 4.

2. The thermosetting binders of claim 1 wherein the basic content of said binders is derived from basic nitrogen atoms.

3. The thermosetting binders of claim 2 wherein the basic content is from about 0.7 to 2.

4. The thermosetting binders of claim 1 wherein the double bond content is from about 0.7 to 3.5.

5. The thermosetting binders of claim 1 including a fatty alcohol having from 1 to 24 carbon atoms.

6. The thermosetting binders of claim 5 wherein the alcohol is unsaturated.

7. The thermosetting binders of claim 5 wherein the alcohol is saturated.

8. The thermosetting binders of claim 1 including a fatty acid having from 1 to 24 carbon atoms.

9. The thermosetting binders of claim 8 wherein the fatty acid is saturated.

10. The thermosetting binders of claim 8 wherein the fatty acid is unsaturated.

11. An aqueous solution of the thermosetting binders of claim 1 wherein the binders are neutralized with a neutralizing acid.

12. Process of providing coating compositions which will cathodically deposit when used in an electrodeposition process including reacting at a temperature of from about 20° to 80° C. (A) 1 mole of a polyisocyanate, (B) at least 1 mole of a dialkylalkanolamine and (C) a member of the group consisting of monohydroxyalkyl(meth)acrylate, monohydroxyalkoxy(meth)acrylate, and monohydroxyallylether of a polyol, said reaction being carried out to an NCO-value of substantially zero to provide a product having a molecular weight of about 500 to about 5000, a basic content of from about 0.5 to 3, and a double bond content of from about 0.5 to 4 for each 1000 molecular weight units of binder, and neutralizing said reaction product with an inorganic or organic acid.

* * * * *